United States Patent Office 2,693,479
Patented Nov. 2, 1954

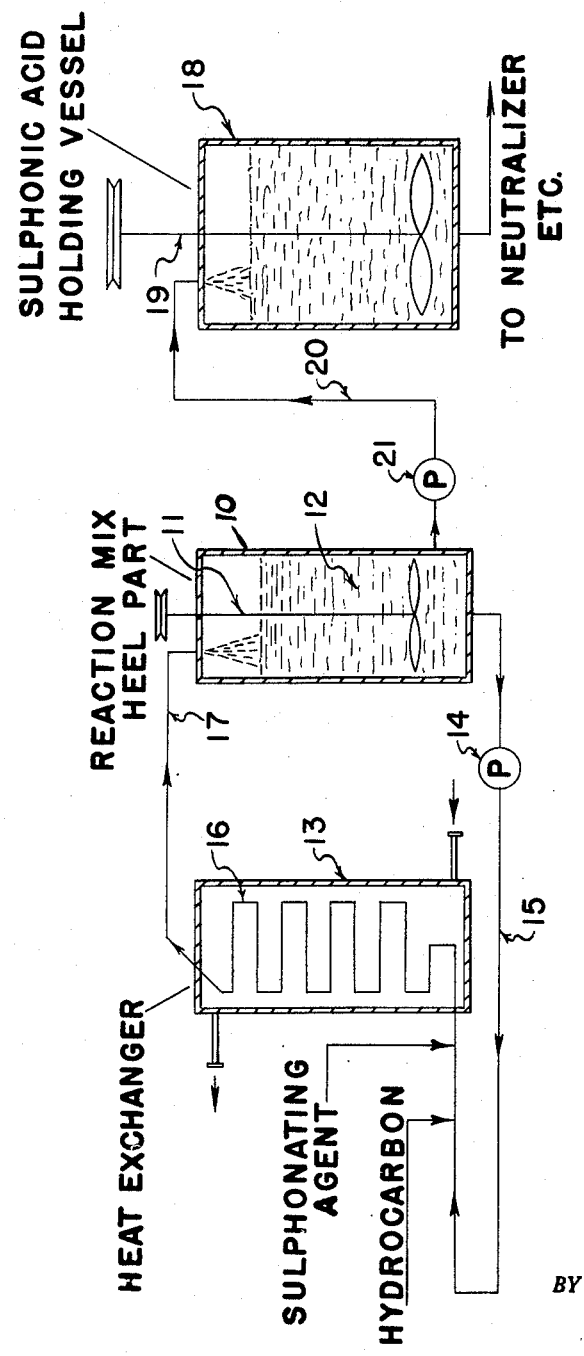
INVENTOR.
JOHN ROSS
ATTORNEY

2,693,479

PROCESS OF PREPARING ORGANIC SULFONATES AND SULFATES

John Ross, Ramsey, N. J., assignor to Colgate-Palmolive Company, Jersey City, N. J., a corporation of Delaware Application February 8, 1950, Serial No. 142,974

6 Claims. (Cl. 260—400)

This invention relates to methods and apparatus for the preparation of organic sulfonates which are useful as surface-active agents in deterging, emulsifying, wetting and penetrating processes. More particularly the invention concerns a continuous process of preparing sulfonic acid mixtures of good color, odor and purity and in high sulfonation yield which are adapted for neutralization to form the corresponding water-soluble salts, as desired, in the production of detergents.

In the preparation of synthetic surface-active compounds of the sulfonate type, and involving the sulfonation of materials, for example high molecular weight alcohols, monoglycerides, esters, phenols, olefins, aromatic hydrocarbons, alkyl aryl hydrocarbons and their halogenated derivatives, utilizing the usual sulfonating agents such as sulfuric acid, oleum, sulfur trioxide, sulfonyl halides, etc., it has been a difficult problem to carry out the sulfonation as a continuous process commercially to produce a good quality sulfonic acid product in high yield. The difficulties are accentuated with the sulfonation of alkylated aromatic hydrocarbons wherein the alkyl portion is a long-chain carbon structure containing about 6 to 18 carbon atoms. Such long-chain high molecular weight hydrocarbons tend to de-alkylate during sulfonation and produce lower-chain compounds, side-reaction products and unsulfonated residues which give the sulfonated mixture an undesirable color and odor. Neutralization of the resultant mixture in the preparation of water-soluble salts for detergent compositions leads to the production of an inferior detergent.

Various methods and apparatus have been proposed heretofore for continuously sulfonating fatty compounds comprising flowing streams of the fatty material and sulfonating agent in confluence and rapidly cooling the resultant reaction mixture. Utilizing such methods, even with highly efficient cooling means a certain amount of localized overheating and decomposition of the fatty material takes place which is undesirable. More recently, in the preparation of sulfonated detergents from alkylated aromatic hydrocarbons, as a batch method, it has been proposed to introduce fresh hydrocarbon into a sulfonator through a feed line containing fresh sulfonating agent e. g. sulfuric acid mixed with some of the previously formed sulfonic acid mixture, and which is being circulated through a cooler and back to the sulfonator. In such a method, however, sulfonation of individual batches are necessitated and control of the proportionate amounts of sulfonated reaction mixture and freshly added material is lacking. It is important to maintain this proportion within certain limits in order to produce a high sulfonation yield while at the same time prevent objectionable discoloration and decomposition of the hydrocarbon.

In accordance with the present invention, the sulfonation of the organic material is carried out as a continuous process utilizing a previously sulfonated heel-part as a solvent or diluent for the freshly added material. A portion of the heel-part is continuously withdrawn from the main body of the heel-part as contained in a sulfonator receptacle and circulated through a cooling or heat exchange zone. To this circulating portion there is continuously and separately introduced fresh organic material and additional sulfonating agent, the freshly added organic material and sulfonating agent being brought together immediately prior to passage of the reaction mixture into the heat exchange zone wherein the heat of reaction, which is exothermic, is rapidly dissipated and the mixture maintained at the optimum temperature for effecting sulfonation. Concurrently, a like quantity of the sulfonated material equal to the amount of freshly added materials is drawn off to a holding vessel and thence to a neutralizing zone or other operational treatment.

The sulfonation reaction is initially quite rapid at temperatures above about 50° F., for example the sulfonation of alkylated benzenes i. e. dodecyl benzene, with strong sulfuric acid (20% SO₃) is over 90% complete within about ten to twenty minutes at 120° F. after mixing the alkylated aromatic hydrocarbon with the sulfonating agent and reaches maximum yield in about an hour. Using 100 parts of dodecyl benzene to 101.5 parts of 20% oleum (by weight) the maximum sulfonation was found to have been reached in one hour at 100–105° F. During this reaction time a large amount of heat is evolved which must be dissipated efficiently to prevent localized overheating. On the other hand it has been observed that the temperature after such initial reaction should not be kept too low otherwise the yield will be adversely affected and the efficiency of the process lowered. An increase in temperature during sulfonation of dodecyl benzene with oleum from 80° F. to 105° F. after the initial reaction resulted in a 4% increase in sulfonation. With the use of oleum of higher SO₃ strength, a correspondingly less amount of oleum is required to obtain maximum sulfonation. To provide for efficient sulfonation the temperature of the reaction mixture preferably is maintained between about 68° and 130° F. Heretofore sulfonation temperatures above about 70° F. have not been generally recommended because at such higher temperatures there was a tendency to produce darker products which are undesirable. Utilizing the improved method of the present invention, however, the sulfonation may be safely carried out at the higher temperatures.

Where a relatively long contact period is desired the mixture is transferred to a suitable holding vessel where the reaction mixture may be held at the same or at somewhat higher or lower temperature. During the reaction efficient mixing of the reactants is accomplished by the forced circulation of the heel-part and use of suitable stirring and dispersing mechanism.

The proportion of heel-part to adduct, that is the sum representing the aggregate of the organic material and sulfonating agent introduced in a given time, is controlled so that there will be a substantial excess of sulfonated heel-part over the adduct. The proportion of heel-part to adduct in parts by weight respectively preferably is maintained between about 8:1 and 20:1 or higher. This dilution ratio of heel-part to adduct is obtained by suitably controlling the rate of flow during circulation of the heel-part relative to the rate of addition thereto of the adduct materials. For example, provided the adduct is introduced at the rate of two parts per minute, in order to maintain a dilution ratio of heel-part to adduct of say, ten parts to one respectively, the heel-part is circulated through the cooling zone and back to the main body of the heel-part at the rate of twenty parts per minute.

The presence of a relatively large proportionate amount of previously sulfonated heel-part during sulfonation of fresh material appears to promote the reaction rather than hinder it. Furthermore, by reason of the dilution effect produced by the heel-part, the temperature of the reaction is more readily controlled. Localized overheating of the reaction mixture is eliminated for all practical purposes by introducing the fresh organic material and the sulfonating agent into the circulating heel-part in such a manner that immediately upon bringing freshly added organic material into contact with fresh or newly added sulfonating agent the reaction mixture is passed without further delay into the cooling or heat-exchange zone where the temperature of the reaction is controlled. This method of eliminating or substantially overcoming the detrimental effects caused by overheating in localized regions of the mixture which otherwise would occur during the initial stage of the sulfonation reaction is an important aspect of the invention and results in achieving a significant advantage over prior known processes.

The residence time, calculated as the average time taken for a representative particle of organic material being sulfonated to pass through the system and be withdrawn from the holding vessel, will vary for different materials, but, in general, such average time usually lies between about 20 and 90 minutes. It will be appreciated that in the continuous flow operation of the system, a certain amount of short-circuiting of material passing through the mixing tanks of course takes place. The average residence time may be calculated for any given set of conditions as described in the article by R. B. MacMullin and M. Weber, Jr. (See American Institute of Chemical Engineers Trans. vol. XXXI, page 409 et seq.) The short-circuiting of material through the system, however, becomes less a factor employing a continuously circulating heel-part and utilizing a holding vessel in accordance with this invention.

The accompanying drawing illustrates diagrammatically a preferred form of apparatus for carrying out the process. In the arrangement shown, a sulfonator 10 is provided, which is equipped with suitable stirring means 11, and in which is retained a sulfonated heel-part such as indicated at 12. A heat exchanger 13 is in communication with the sulfonator 10 through which a portion of the sulfonation mixture in the sulfonator is continuously circulated by means of a pump 14 in pipe line 15. The circuit is completed back to the sulfonator 10 from line 15 by way of the heat exchanger coils 16 and return pipe line 17 which is arranged to discharge the material into the top of the sulfonator. Heat exchanger coils 16 are cooled by circulating any suitable fluid refrigerant through the heat exchanger and over the coils as indicated on the drawing.

A holding vessel 18, equipped with suitable stirring mechanism 19 is connected to the sulfonator 10 by the pipe line 20. Sulfonated material withdrawn from the lower part of the sulfonator 10 is pumped to the holding vessel 18 by means of a pump 21 located in the pipe line 20. To provide for intimate mixing and adequate dispersion of the sulfonating agent throughout the reaction mass and to prevent any of the sulfonatable material from passing through the system without being contacted with sulfonating agent provision is made for discharging the material from the pipes 17 and 20 into the top of the vessels 10 and 18 in the form of a spray or multiple jets or streams as illustrated on the drawing. To accomplish this suitable nozzles may be fitted on the discharge ends of the pipes 17 and 19.

The duration of treatment in the system comprising the sulfonator and heat exchanger may be suitably regulated, as by varying the length and size of the cooling coils 16 and sulfonator 10, and the rate of flow of material through the system, whereby the sulfonation of freshly added material may be substantially completed upon reaching the lower part of the sulfonator and even without the inclusion of the additional residence time as provided for in the holding vessel 18. Further, where the duration of the treatment is desired to be still further increased, this may be accomplished by providing suitable baffle means in the sulfonator or holding vessel or both as required, to lengthen the path the material is required to travel to reach the bottom of the sulfonator or holding vessel where the same is discharged. The contact time is thus increased under similar operating conditions to insure substantial completion of the sulfonation reaction before the same is drawn off for use or further treatment.

In a typical sulfonation operation, as illustrated by the sulfonation of an alkylated aromatic hydrocarbon with 20% fuming sulfuric acid, a portion of the hydrocarbon mixture is reacted with sulfuric acid at a relatively low temperature, for example between about 30° and 70° F., by addition of oleum (20%) to the hydrocarbon in the proportion of approximately 1:1 by weight. The pre-sulfonated mixture is then used as the heel-part in the sulfonator 10, and the pump 14 operated to cause circulation of the heel-part through the heat exchanger and sulfonator. To the circulating heel-part there is added fresh hydrocarbon and fuming sulfuric acid in the proportionate amounts for sulfonation (preferably 1:1 by weight) and the resultant reaction mixture passed through the heat exchanger 13 where the temperature of the reaction is suitably controlled. The temperature in the heat exchanger is generally somewhat lower than in the rest of the system, for example between about 70° and 95° F. The relatively higher temperature of sulfonation is permitted due to the presence of sufficiently large amounts of previously sulfonated material and which constitutes the heel-part. Assuming it is desired to maintain a heel/adduct ratio by weight of 20 parts of heel to 1-part of adduct, and it is planned to introduce the adduct (comprising the sum of the parts of fuming sulfuric acid and alkylated aromatic hydrocarbon) at the rate of one part per minute, then sufficient sulfonated heel-part must be provided so that the same can be circulated at the rate of 20 parts per minute and thus provide for a dilution rate of 1 part adduct to 20 parts heel. Operating in this manner the proportion of heel/adduct will remain constant at 20/1 provided there is continuously removed from the system a like quantity of sulfonated material as supplied by the adduct and at the same rate. Provided also it is desired to have an average holding or contact time for the reactants of say 90 minutes, then it would require that the capacity of the system be sufficient to hold at least 90 parts of adduct to permit continuous operation and allow for the desired contact time.

The hydrocarbon and sulfonating agent is introduced in the line 15 containing the circulating heel-part immediately prior to its passage to the heat exchanger coils 16 in order that the initial exothermic heat of reaction during sulfonation will be rapidly dissipated. Sulfonated material continuously withdrawn from the bottom of the sulfonator 10 is transferred to the holding vessel 18 which is preferably of somewhat larger capacity than the reaction vessel 10 to provide for an additional average residence time to insure completion of the sulfonation.

The average residence time of the sulfonated material in the system before being withdrawn from the holding vessel 18 is such as to permit the sulfonation to reach completion or an equilibrium point representing the maximum yield attainable. To provide for this, where increased holding time is required, the height and capacity of the vessel 18 is increased to allow for the longer residence time and thus insure completion of the sulfonation before drawing off of the sulfonated material. In the sulfonation of alkylated aromatic hydrocarbons, such as commonly employed in the production of sulfonated detergent compositions, it has been observed, as aforementioned, that when the sulfonation is carried out using fuming sulfuric (20% $SO_3$) and at a reaction temperature of between 100 and 105° F., the maximum sulfonation yield is obtained in approximately one hour total contact time. At other reaction temperatures and/or employing different reactants the required contact time will, of course, change.

During normal operation of the system illustrated by the drawing, pumps 14 and 21 will be actuated continuously and the amount of sulfonated material withdrawn from the sulfonator at any particular time will be substantially equal to the adduct introduced into line 15. Sulfonic acid material transferred to the holding vessel 18 is generally maintained at the same temperature as in the sulfonator 10 or at a slightly higher temperature. The sulfonic acid mix in the holding vessel, is vigorously stirred to provide for intimate contacting of the reactants.

The following typical examples are illustrative of the process of the invention, showing how the same may be employed for sulfonating different organic substances. The parts mentioned in the examples refer to parts by weight.

*Example 1*

Approximately 50 parts of a heel-part comprising alkyl aryl sulfonate, previously prepared by reacting an alkylated aromatic hydrocarbon fraction boiling between about 425° and 625° F., (containing chiefly mono-phenyl dodecanes) with fuming sulfuric acid (20% $SO_3$) at a temperature between 40° and 55° F., is placed in a reaction vessel provided with means for withdrawing and circulating a portion of the heel-part through a cooling coil of a heat exchanger. To this pre-sulfonated mass there is introduced separately in continuous streams fresh alkylated aromatic hydrocarbon and fuming sulfuric acid (20% $SO_3$), the acid being introduced into the heel-part portion which is being circulated through the heat exchanger immediately prior to the passage of the reaction mixture to the heat exchanger. For each part of fresh hydrocarbon added there is introduced one part of fuming sulfuric acid A dilution ratio of 15 parts heel-part to 1 of the adduct is maintained by circulating the heel-part at the rate of 30 parts per minute while the adduct is introduced at the rate of 2 parts per minute, e. g. one part hydrocarbon and one part sulfuric acid. To provide for an average total contact time of an hour, a second vessel having a capacity for holding approximately 120 parts of the sulfonate is employed, sulfonated material being withdrawn from the reaction vessel and transferred to the holding vessel at the same rate as the adduct is introduced into the system.

During operation the temperature in the heat exchanger is maintained at approximately 70° F. and between 90° and 100° F., in the holding vessel. By operating the system under these conditions fresh hydrocarbon material may be continuously introduced into the system and substantially completely sulfonated alkyl aryl material withdrawn continuously from the holding vessel. Finished alkyl aryl sulfonates of excellent color and which are free from objectionable odors are obtained. The organic sulfonates thus prepared are especially suitable for conversion into water-soluble salts in the production of detergents.

*Example 2*

A similar run is made as described in Example 1 using a previously sulfonated heel-part to adduct ratio by weight of 20:1 and withdrawing sulfonated material continuously from the bottom of the holding vessel after a total contact or residence period in the system of approximately 90 minutes at 110° F. The capacity of the holding vessel in this instance is increased to hold approximately 200 parts of the sulfonated reaction mixture to provide for the increased holding time.

*Example 3*

Approximately 50 parts of coconut oil monoglyceride sulfate is employed as a heel-part and circulated as in Example 1. While the same is continuously stirred and cooled to approximately 80° F. in the reaction vessel and to between about 100° and 104° F. in the holding vessel, coconut oil monoglyceride is introduced continuously, there being concurrently added fuming sulfuric acid (20% SO₃) in a weight ratio of 1 mol monoglyceride to 4 mols sulfuric acid. As the fatty oil monoglyceride and sulfuric acid adduct is introduced into the heel-part a corresponding amount of sulfated monoglyceride is removed from the system. A dilution ratio of heel-part to adduct is maintained at approximately 10:1 respectively by circulating the heel-part at a rate ten times that of the adduct rate of addition. An average contact time of thirty minutes is provided. By thus controlling the rate of addition of the adduct material and contact time of freshly added fatty-oil monoglyceride, the sulfated monoglyceride product is obtained in excellent yield and which is of good color and quality.

*Example 4*

To 100 parts of a pre-sulfated coconut oil monoglyceride heel-part which is being circulated through a heat exchanger coil maintained at a temperature of 90 to 95° F., there is introduced as an adduct to the circulating heel-part in continuous separate streams, glycerine, coconut oil and fuming sulfuric acid (20% SO₃). The proportion of reactants introduced is controlled such that for each part of coconut oil there is added approximately 0.30 parts of glycerine and 2.54 parts of fuming sulfuric acid. A dilution ratio of heel-part to adduct is maintained at about 10:1 respectively as in Example 3. The sulfuric acid is introduced into the circulating heel-part immediately prior to passage of the reaction mixture, containing the heel-part constituent and freshly introduced fatty oil and glycerine, into the heat exchanger coils. The holding vessel to which sulfated material is continuously transferred from the circulating heel-part is held at a temperature of 100–105° F., and an average total contact-time of one hour is provided for completion of the reaction.

In this manner a continuous method of producing sulfated fatty acid monoglycerides from fatty oil, glycerine and oleum is achieved by concurrent introduction and reaction of the oil, glycerine and sulfuric acid in the presence of pre-sulfated fatty acid monoglyceride.

While a preferred form of apparatus and method has been described and illustrated for practicing the invention, it will be obvious various modifications and substitutions may be made therein without departing from the broader scope of the invention, the limitations of which are defined in the following claims.

What is claimed is:

1. The process which comprises establishing a heel-part comprising a reaction product obtained by reacting a sulfonating agent with organic material selected from the group consisting of alkylated aromatic hydrocarbons and fatty acid monoglycerides, continuously withdrawing a portion of said heel-part and circulating the same through a cooling zone, continuously and separately introducing fresh organic material and fresh sulfonating agent into said circulating heel-part immediately prior to circulation of the latter through said cooling zone, the ratio of circulating heel-part to the sum of the quantities of freshly added organic material and sulfonating agent being within the range of about 8:1 to about 20:1 parts by weight respectively.

2. The process which comprises establishing a heel-part comprising a reaction product obtained by reacting a sulfonating agent with organic material selected from the group consisting of alkylated aromatic hydrocarbons and fatty acid monoglycerides, continuously withdrawing a portion of said heel-part and circulating the same through a cooling zone, continuously and separately introducing fresh organic material and fresh sulfonating agent into said circulating heel-part, the ratio of circulating heel-part to the sum of the quantities of freshly added hydrocarbon and sulfonating agent being within the range of about 8:1 to about 20:1 parts by weight respectively, said freshly added organic material being brought into initial contact with the freshly added sulfonating agent in the circulating heel-part immediately prior to circulation of the latter through said cooling zone, and continuously withdrawing from the system an amount of reaction product approximating the sum of the quantities of freshly added materials.

3. The process which comprises establishing a heel-part comprising a reaction product obtained by reacting an alkylated aromatic hydrocarbon with a sulfonating agent, continuously withdrawing a portion of said heel-part and circulating the same through a cooling zone, continuously and separately introducing fresh alkylated aromatic hydrocarbon material and fresh sulfonating agent into said circulating heel-part immediately prior to circulation of the latter through said cooling zone, the ratio of said circulating heel-part to the adduct consisting of the sum of the quantities of said freshly added alkylated aromatic hydrocarbon and sulfonating agent being about 10 parts by weight of the former to about 1 part by weight of the latter, and continuously withdrawing sulfonated alkylated aromatic hydrocarbon material in an amount approximating the quantity of adduct introduced.

4. A process for the preparation of alkylated aromatic hydrocarbon sulfonic acids suitable for conversion into water soluble salts having detergent properties which comprises, establishing a heel-part comprising a reaction product obtained by reacting fuming sulfuric acid with an alkylated aromatic hydrocarbon having an alkyl substituent containing at least 6 carbon atoms per molecule, withdrawing a portion of said heel-part and circulating the same through a heat exchanger, introducing fresh hydrocarbon material and fuming sulfuric acid into said circulating heel-part in separate streams and in amounts sufficient to produce the corresponding sulfonic acid product, said fresh materials being introduced into said circulating heel-part just prior to entrance of the latter into said exchanger, the ratio of said circulating heel-part to the sum of the quantities of fresh hydrocarbon and fuming sulfuric acid being within the range of about 8:1 to about 20:1 parts by weight respectively, and continuously withdrawing an alkylated aromatic hydrocarbon sulfonic acid product.

5. The process which comprises establishing a heel-part comprising a reaction product obtained by reacting a fatty acid monoglyceride with a sulfonating agent, continuously withdrawing a portion of said heel-part and circulating the same through a cooling zone, continuously and separately introducing fresh fatty acid monoglyceride material and fresh sulfonating agent into said circulating heel-part immediately prior to circulation of the latter through said cooling zone, the ratio of said circulating heel-part to the adduct consisting of the sum of the quantities of said freshly added monoglyceride material and sulfonating agent being within the range of about 8:1 to about 20:1 parts by weight respectively, and continuously withdrawing sulfated fatty acid monoglyceride material in an amount approximating the quantity of adduct introduced.

6. A process for preparing sulfuric acid esters of coconut oil monoglycerides which are light in color and suitable for conversion into water soluble salts having detergent properties which comprises, establishing a heel-part comprising a product obtained by reacting fuming sulfuric acid with coconut oil and glycerine, continuously withdrawing a portion of said heel-part and circulating the same through a heat exchanger, continuously and separately introducing coconut oil, glycerine, and fuming sulfuric acid into said circulating heel-part in the proper amounts to react and form the sulfuric acid ester of coconut oil monoglyceride, said coconut oil and glycerine being added continuously to said circulating heel-part prior to the continuous introduction of said fuming sulfuric acid, said fuming sulfuric acid being added to said heel-part containing freshly added coconut oil and glycerine immediately prior to passage of the resultant mixture to said heat exchanger, the ratio of said circulating heel-part to the sum of the quantities of coconut oil, glycerine, and fuming sulfuric acid added being about 10 parts by weight of the former to about one part by weight of the latter.

References Cited in the file of this patent

UNITED STATES PATENTS

| Number | Name | Date |
|---|---|---|
| 1,970,556 | Carswell | Aug. 21, 1934 |
| 2,106,521 | Deanesly | Jan. 25, 1938 |
| 2,187,244 | Mills | Jan. 16, 1940 |
| 2,470,896 | Mavity | May 24, 1949 |